(12) United States Patent
Mihara

(10) Patent No.: US 7,743,228 B2
(45) Date of Patent: Jun. 22, 2010

(54) INFORMATION PROCESSING APPARATUS AND METHOD FOR OBTAINING SOFTWARE PROCESSING LOG

(75) Inventor: Makoto Mihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 778 days.

(21) Appl. No.: 11/300,391

(22) Filed: Dec. 14, 2005

(65) Prior Publication Data

US 2006/0136134 A1    Jun. 22, 2006

(30) Foreign Application Priority Data

Dec. 16, 2004    (JP) ............... 2004-364783

(51) Int. Cl.
    *G06F 12/14*    (2006.01)
(52) U.S. Cl. .................. 711/163; 714/45; 714/723
(58) Field of Classification Search ............ 711/163; 714/45, 723
    See application file for complete search history.

(56) References Cited

U.S. PATENT DOCUMENTS

| | | | | |
|---|---|---|---|---|
| 6,219,728 | B1* | 4/2001 | Yin | 710/52 |
| 6,272,611 | B1* | 8/2001 | Wu | 711/173 |
| 6,732,124 | B1* | 5/2004 | Koseki et al. | 707/202 |
| 2002/0165899 | A1* | 11/2002 | Kagan et al. | 709/104 |
| 2003/0061273 | A1* | 3/2003 | Hayduk | 709/203 |
| 2003/0145164 | A1* | 7/2003 | Hoskins et al. | 711/112 |
| 2003/0200412 | A1* | 10/2003 | Peinado et al. | 711/202 |
| 2004/0003326 | A1 | 1/2004 | Lizuka | |
| 2004/0158764 | A1* | 8/2004 | Sonoda et al. | 714/4 |
| 2004/0268026 | A1* | 12/2004 | Royer et al. | 711/104 |
| 2005/0268058 | A1* | 12/2005 | Drasnin et al. | 711/163 |
| 2006/0095609 | A1* | 5/2006 | Radhakrishnan et al. | 710/52 |

FOREIGN PATENT DOCUMENTS

JP    2004-038311 A    2/2004

* cited by examiner

*Primary Examiner*—Matt Kim
*Assistant Examiner*—Hal Schnee
(74) *Attorney, Agent, or Firm*—Canon U.S.A., Inc. I.P. Division

(57) ABSTRACT

In an information processing apparatus for relaying a calling from a first module to a function inside a second module in software divided into a plurality of modules, the calling is relayed from the first module to the function inside the second module. A log in the second module corresponding to the calling is obtained. The log includes at least a write starting address of binary data and a data size thereof. An area where the binary data is written is determined based on the write starting address and the data size thereof. Whether or not writing into the decided area is permitted is determined. On the basis of the determination result, writing into the decided area of the binary data is controlled. As a result, writing into an invalid area of the log is prevented without modifying the software.

5 Claims, 16 Drawing Sheets

FIG. 3

| | | | | |
|---|---|---|---|---|
| EXE | CODE | | | |
| | DATA | | | |
| | Import Address Table | A.DLL | Func CAA Address | ~61 |
| | | | Func CAB Address | ~62 |
| | | | Func CAC Address | ~63 |
| | | B.DLL | Func CBA Address | ~64 |
| | | | Func CBB Address | ~65 |
| | | | Func CBC Address | ~66 |
| DLL | A.DLL | | Func AA Code | ~67 |
| | | | Func AB Code | ~68 |
| | | | Func AC Code | ~69 |
| | B.DLL | | Func BA Code | ~70 |
| | | | Func BB Code | ~71 |
| | | | Func BC Code | ~72 |
| | C.DLL | | Func CAA Code (Call Func AA) | ~73 |
| | | | Func CAB Code (Call Func AB) | ~74 |
| | | | Func CAC Code (Call Func AC) | ~75 |
| | | | Func CBA Code (Call Func BA) | ~76 |
| | | | Func CBB Code (Call Func BB) | ~77 |
| | | | Func CBC Code (Call Func BC) | ~78 |

52 — EXE
58 — DLL

FIG. 10

```
DLL NAME:       A. DLL
FUNCTION NAME:  FuncAA
ARGUMENT:       DWORD dwID
RETURN VALUE:   DWORD dwRet DLL NAME:       A. DLL
FUNCTION NAME:  FuncAB
ARGUMENT:       DWORD dwBufSize
                char  *pBuf (Size=dwBufSize)
RETURN VALUE:   int nRet DLL NAME:       B. DLL
FUNCTION NAME:  FuncBA
ARGUMENT:       DWORD dwID
RETURN VALUE:   DWORD dwRet DLL NAME:       B. DLL
FUNCTION NAME:  FuncBB
ARGUMENT:       DWORD dwHandle
RETURN VALUE:   int nRet
```

FIG. 11

| | |
|---|---|
| DLL NAME: | A. DLL |
| FUNCTION NAME: | FuncAA |
| ARGUMENT: | DWORD dwID : 256 |
| RETURN VALUE: | DWORD dwRet : 0 |
| In TIME: | 2002/03/25 22 : 24 : 12. 025 |
| Out TIME: | 2002/03/25 22 : 24 : 12. 035 |
| | |
| DLL NAME: | A. DLL |
| FUNCTION NAME: | FuncAB |
| ARGUMENT: | DWORD dwBufSize : 24 |
| | char *pBuf : 0x5034206D |
| | Size=dwBufSize, DataID=0x0001 |
| RETURN VALUE: | int nRet : 0 |
| In TIME: | 2002/03/25 22 : 24 : 12. 046 |
| Out TIME: | 2002/03/25 22 : 24 : 12. 057 |
| | |
| DLL NAME: | A. DLL |
| FUNCTION NAME: | FuncAB |
| ARGUMENT: | DWORD dwBufSize : 24 |
| | char *pBuf : 0x503860C |
| | Size=dwBufSize, DataID=0x0002 |
| RETURN VALUE: | int nRet : 0 |
| In TIME: | 2002/03/25 22 : 24 : 12. 068 |
| Out TIME: | 2002/03/25 22 : 24 : 12. 079 |

DataID :   0x0001

00000000 :    01  5D  33  B2  20  49  20  39
00000008 :    02  5D  33  B2  20  49  30  39
00000010 :    01  6D  33  B2  20  59  20  39

DataID :   0x0002

00000000 :    01  5D  44  B2  20  49  20  39
00000008 :    02  5D  44  B2  20  49  30  39
00000010 :    01  6D  44  B2  20  59  20  39

DataID :   0x0003

00000000 :    01  5D  55  B2  20  49  20  39
00000008 :    02  5D  55  B2  20  49  30  39
00000010 :    01  6D  55  B2  20  59  20  39

DataID :   0x0004

00000000 :    01  5D  66  B2  20  49  20  39
00000008 :    02  5D  66  B2  20  49  30  39
00000010 :    01  6D  66  B2  20  59  20  39

...

INFORMATION PROCESSING APPARATUS AND METHOD FOR OBTAINING SOFTWARE PROCESSING LOG

BACKGROUND OF THE INVENTION

1. Field of the Invention

The present invention relates to an information processing apparatus for obtaining a software processing log and an information processing method for use therewith.

2. Description of the Related Art

Software failures with a low reproducibility rate are often dealt with by obtaining a software processing log. Hitherto, a processing log is obtained by modifying the application software module so as to add a processing log obtaining routine. However, in the above-described method requiring a modification of application software, such as embedding log obtaining code, the modification processing becomes complicated.

Accordingly, there is proposed a method in which, in software that is divided into a plurality of modules, by providing a log obtaining module for relaying the calling of a function from a module corresponding to application software, the module being present within another module, and for obtaining a processing log in the other module corresponding to that calling, the log of processing can be obtained without performing complex modifications of application software (refer to, for example, Japanese Patent Laid-Open No. 2004-38311).

When a log is to be obtained as binary data using such a log obtaining module, access is made to data on the basis of a memory pointer defined in a parameter for a function, and the data is stored. At this time, when part or all of the binary data is placed in an invalid area where access is prohibited due to a failure, etc., of application software, as a result of the log obtaining software accessing the area, an exception occurs. Therefore, corresponding exception processing needs to be performed.

In regard to the above, a method in which the application software itself is changed and an invalid access to memory is detected has been proposed. However, since the change of the application software is complex, this is not effective.

SUMMARY OF THE INVENTION

Accordingly, the present invention aims to be capable of preventing a log from being written into an invalid area without the need to modify application software.

The present invention provides an information processing apparatus for relaying a calling from a first module to a function inside a second module in software divided into a plurality of modules, the information processing apparatus including: a log obtaining unit configured to relay the calling from the first module to the function inside the second module and obtain a log in the second module corresponding to the calling, the log including at least a write starting address of binary data and a data size thereof; an area deciding unit configured to decide an area where the binary data is written based on the write starting address and the data size; a determination unit configured to determine whether writing into the area decided by the area deciding unit is permitted; and a write control unit configured to control writing into the decided area of the binary data based on a determination result by the determination unit.

The present invention provides an information processing method for relaying a calling from a first module to a function inside a second module in software divided into a plurality of modules, the information processing method including: an obtaining step of relaying the calling from the first module to the function inside the second module and obtaining a log in the second module corresponding to the calling, the log including at least a write starting address of binary data and a data size thereof; a deciding step of deciding an area where the binary data is written based on the write starting address and the data size; a determining step of determining whether writing into the area decided by the deciding step is permitted; and a write control step of controlling writing of the binary data into the area decided by the deciding step based on a determination result in the determining step.

Other features in addition those discussed above shall be apparent to those skilled in the art from the description of exemplary embodiments of the invention which follow. In the description, reference is made to accompanying drawings, which form a part thereof, and which illustrate an example of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 3 illustrates a state in which software is loaded into a memory when a calling of a function is relayed using an Import Address Table (IAT) Patch as log obtaining code.

FIG. 10 shows an example of a function definition file for indicating the format of parameters for a function and a method and the format of a return value.

FIG. 11 shows an example of a log obtained using the function definition file.

FIG. 12 shows, as an example, the entity of a binary log file stored together with the log.

DESCRIPTION OF THE EMBODIMENTS

An embodiment of the present invention will now be described below in detail with reference to the accompanying drawings.

Figure 1:
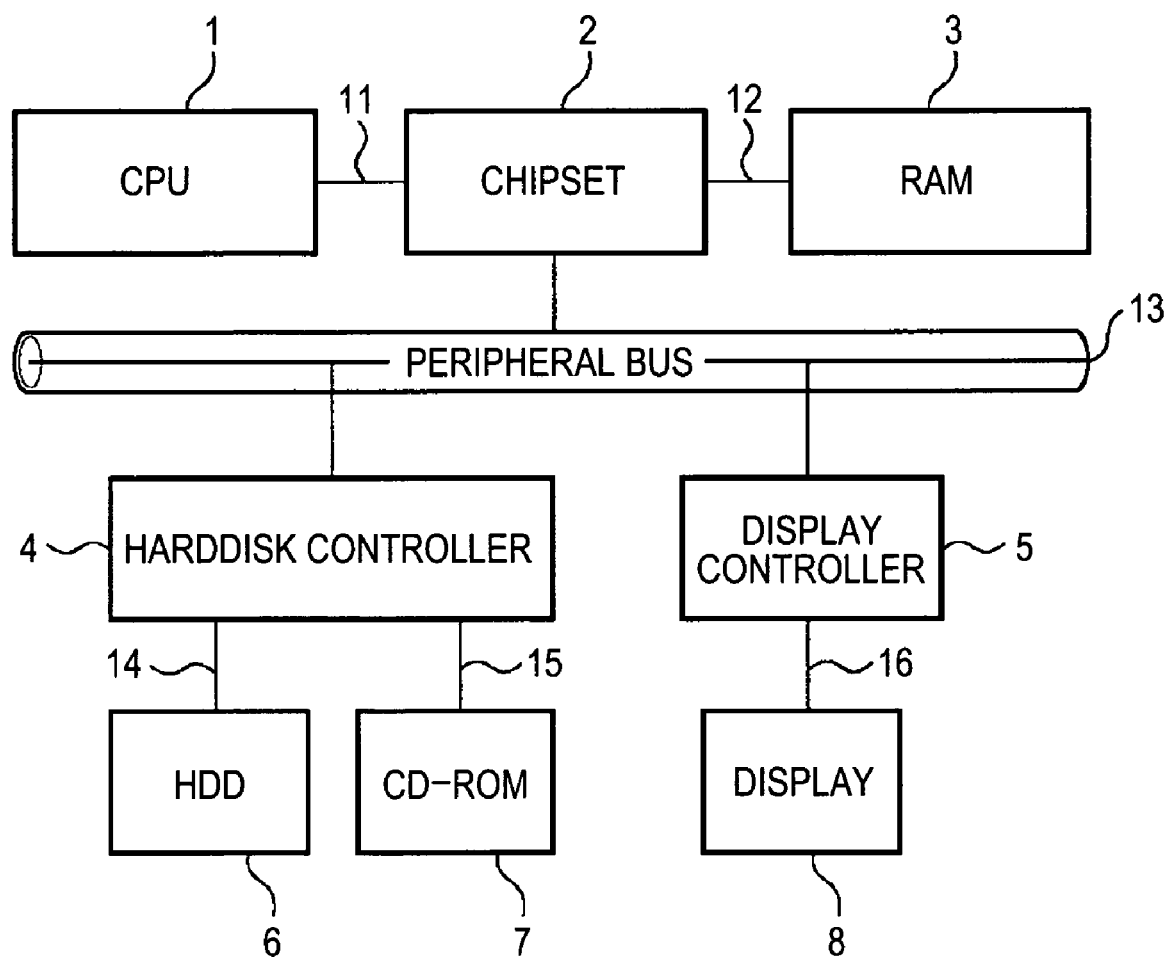
FIG. 1 shows the hardware configuration of an information processing apparatus according to exemplary embodiments of the present invention.

FIG. 1 shows an example of the configuration of an information processing apparatus corresponding to this embodiment. In order to simplify descriptions, it is assumed in this embodiment that an information processing system is constructed inside one personal computer (PC). The feature of the present invention is effective regardless of the case in which the information processing system is constructed inside one PC or it is constructed as a network system inside a plurality of computers.

In this information processing apparatus, a central processing unit (CPU) 1, a chip set 2, a random access memory (RAM) 3, a hard disk controller 4, a display controller 5, a hard disk drive (HDD) 6, a compact disk-read-only memory (CD-ROM) drive 7, and a display 8 are incorporated. The CPU 1 and the chip set 2 are connected to each other via a signal line 11, and the chip set 2 and the RAM 3 are connected to each other via a signal line 12. The chip set 2 and various kinds of peripheral devices 4 and 5 are connected to one another via a peripheral device bus 13. The hard disk controller 4 and the hard disk drive 6 are connected to each other via a signal line 14 and the hard disk controller 4 and the CD-ROM drive 7 are connected to each other via a signal line 15. The display controller 5 and the display 8 are connected to each other via a signal line 16.

Figure 2:
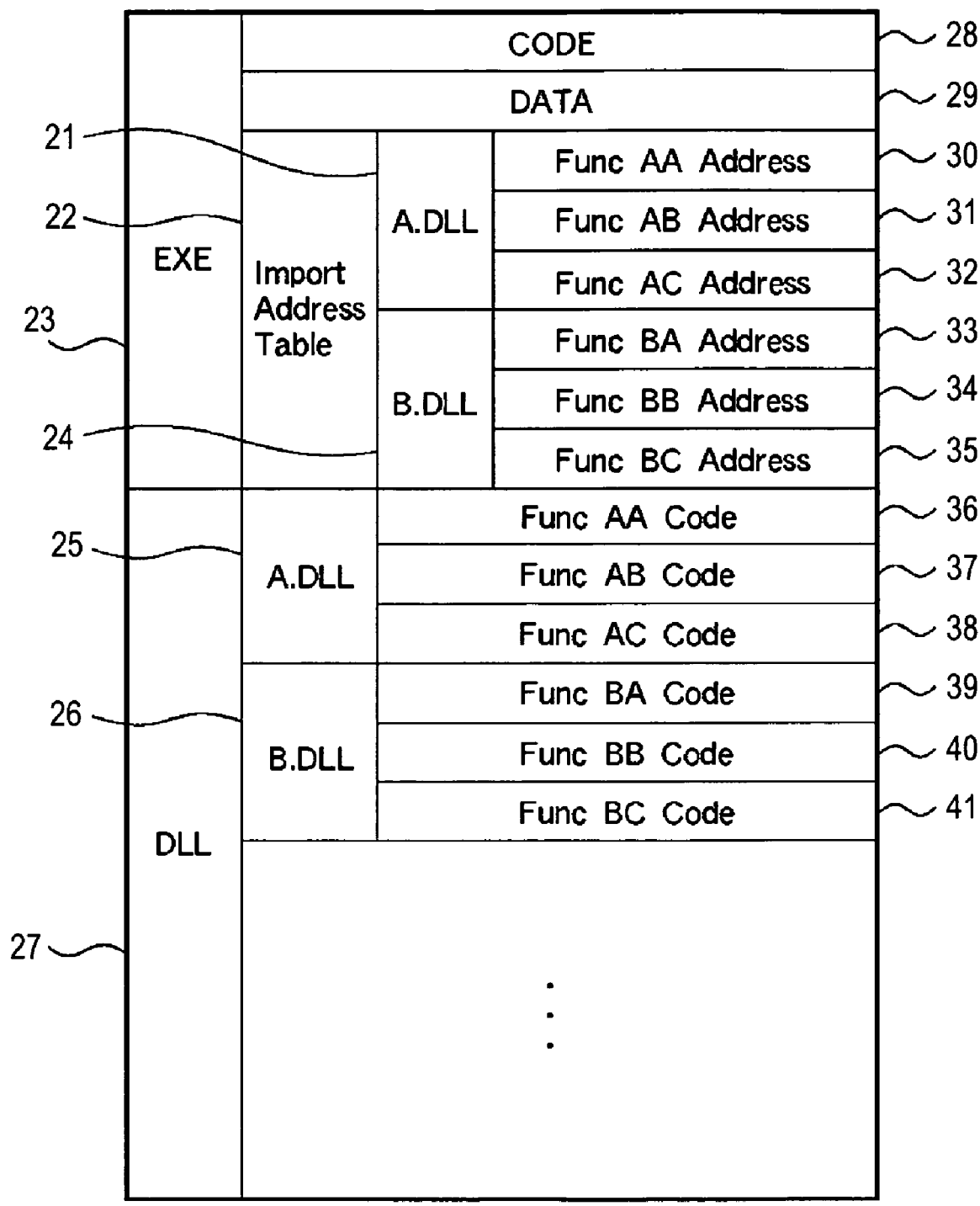
FIG. 2 illustrates a state in which software divided into a plurality of modules is loaded into a memory.

In order to describe the information processing apparatus corresponding to this embodiment, first, referring to FIG. 2, a description is given of how software divided into a plurality of modules is loaded into a memory in a normal state. FIG. 2 shows an example of the internal structure of a RAM.

Usually, software divided into a plurality of modules exists in such a manner as to be divided into an executable file (EXE) 23 for performing the overall control, and a dynamic link library (DLL) 27 that exists as a module and shares the supplementary role of the EXE. In the RAM 3, both the EXE and the DLL are loaded. The EXE is composed of a code segment 28, a data segment 29, and an import function address table 22. The import function address table is further divided 21 and 24 according to the DLL to which a function belongs, and an address at which each function is loaded for each DLL is written 30 to 35.

The entity of the function of the DLL is loaded differently for each DLL 25 and 26, and each function is loaded as a part of the corresponding DLL 36 to 41. FIG. 2 shows an example in which one EXE uses functions inside two dynamic link libraries of A.DLL and B.DLL, and the number of functions that are actually used are six, that is, Func AA, Func AB, Func AC, Func BA, Func BB, and Func BC.

When code inside a code segment 28 of an EXE calls the function Func AA, first, the address 30 of Func AA, written inside the import function address table, is read. At the address, the address of the Func AA code 36 that is read as part of A.DLL is written, and by calling the address, the code of the EXE can call Func AA of A.DLL.

Next, referring to FIG. 3, a description is given of an example of the memory structure of an information processing apparatus when a function call is relayed using a technique of an Import Address Table (IAT) Patch as log obtaining code.

When a log is begun to be obtained, C.DLL 58, which is a DLL for IAT Patch, is loaded into memory. The C.DLL 58 rewrites the address of the function written into an import function address table 52, into the address of Func CAA 61, Func CAB 62, Func CAC 63, Func CBA 64, Func CBB 65, and Func CBC 66, which are log obtaining codes inside C.DLL. Code (73 to 78) of Func CAA, Func CAB, Func CAC, Func CBA, Func CBB, and Func CBC inside C.DLL record a log and call corresponding functions Func AA 67, Func AB 68, Func AC 69, Func BA 70, Func BB 71, and Func BC 72 that are loaded into memory so as to receive the original function calling.

Figure 4:
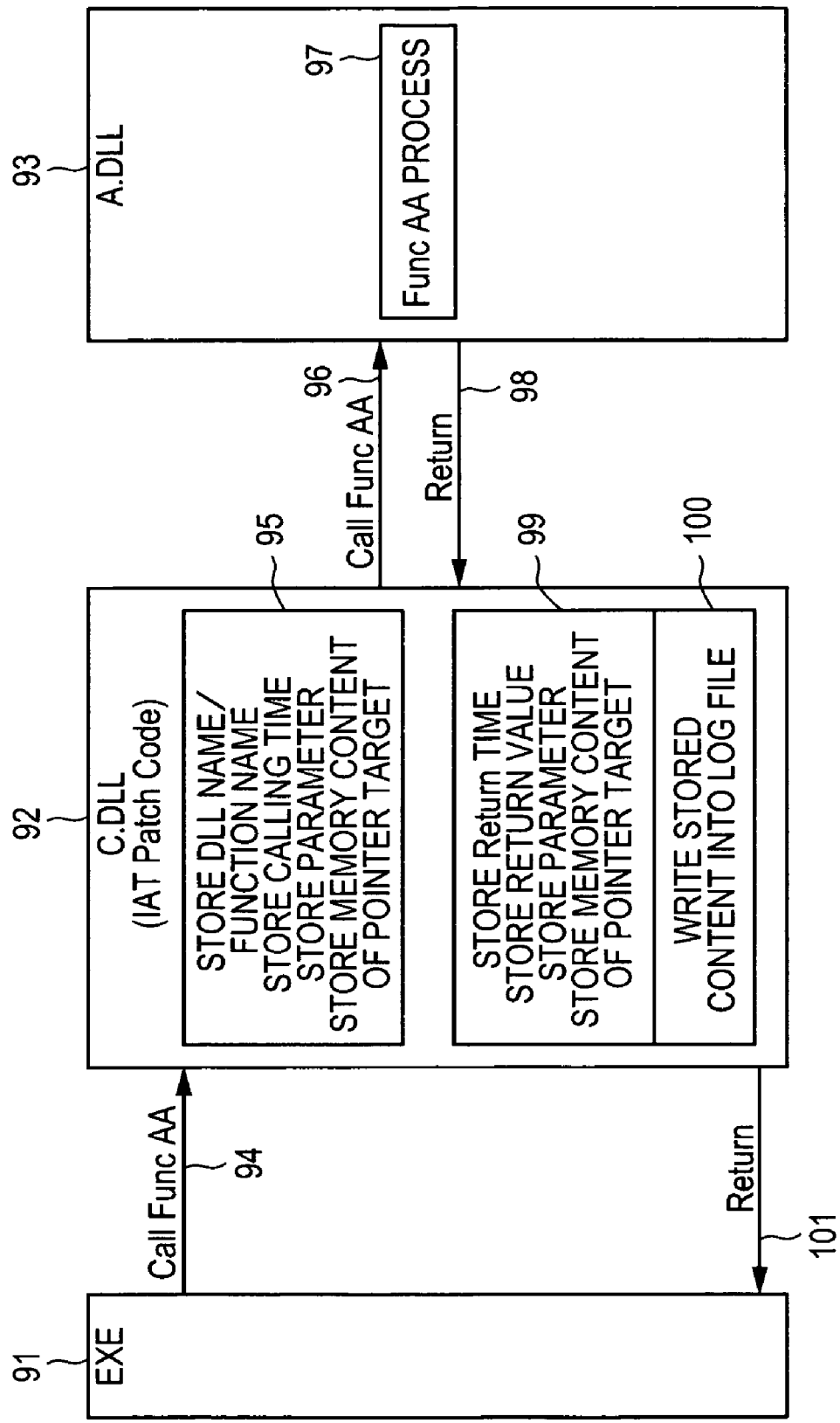
FIG. 4 shows an example of a timing chart when a process for the IAT Patch is performed.

FIG. 4 is a timing chart illustrating processing of the IAT Patch in FIG. 3. In order to simplify descriptions, FIG. 4 shows an example of how log obtaining code by the IAT Patch operates when the EXE calls Func AA inside A.DLL. The same processing is performed on the other functions.

When an EXE 91 calls Func AA 94, the log obtaining code inside C.DLL stores the DLL name and the function name in memory, stores the calling time in memory, stores the parameter during calling in memory, and stores the memory content indicated by the pointer parameter during calling in memory 95. Thereafter, C.DLL 92 calls Func AA inside A.DLL 93, which should have been originally called 96.

When the Func AA processing 97 of A.DLL 93 is completed and control is returned to C.DLL 98, C.DLL 92 stores the time of return time in memory, stores the return value in memory, and stores the memory content indicated by the pointer parameter at return time in memory 99. Thereafter, C.DLL 92 writes the stored log information in a file 100, and control is returned to the EXE 91 as if Func AA 97 of A.DLL 93 is normally terminated 101.

Figure 5:
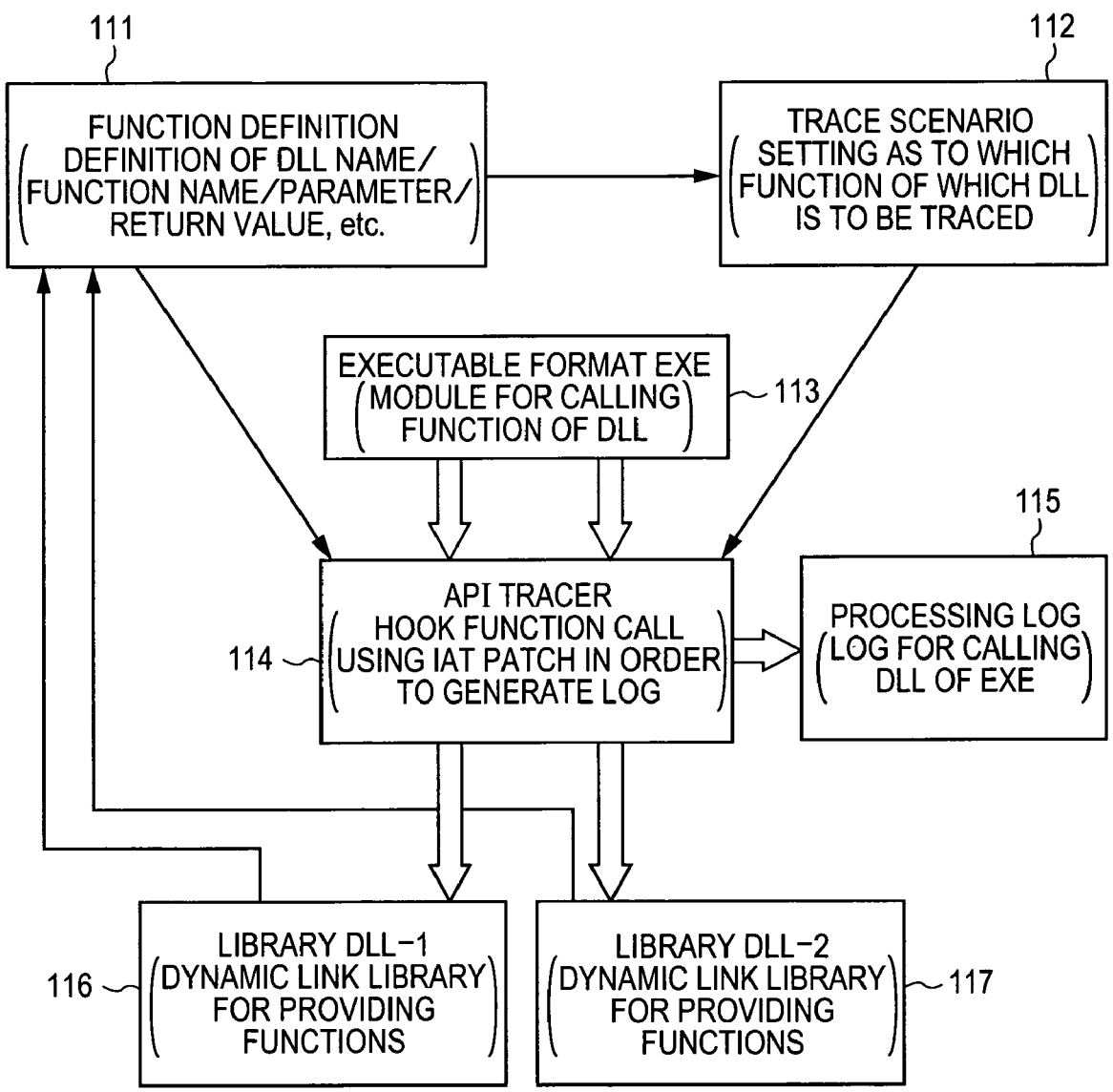
FIG. 5 shows an example of an operation when an executable format file (EXE) is executed.

FIG. 5 shows an example of an operation when the executable format file (EXE) is executed in an information processing apparatus corresponding to this embodiment. Usually, an EXE 113, in an executable format, calls functions inside DLL-1 116 and DLL-2 117. Here, log obtaining code called an application programming interface (API) tracer 114 is embedded, and a processing log 115 is generated. The API tracer 114 operates on the basis of a file (111) in which function definitions of DLL-1 116 and DLL-2 117 are described and on the basis of a set scenario 112 and a log is obtained by rewriting an import function table of which function is of which DLL.

Figure 6:
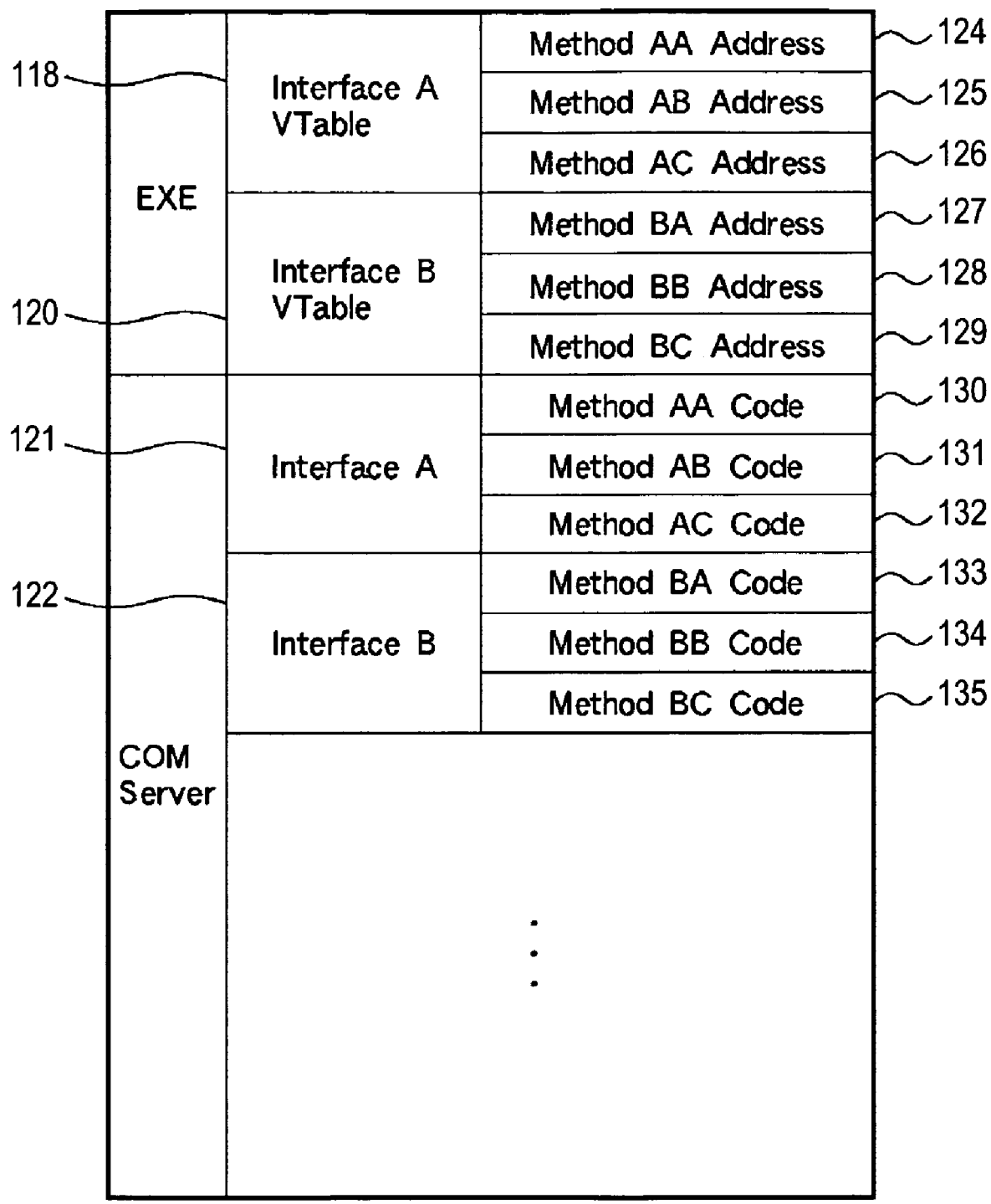
FIG. 6 shows an example of a memory structure when an instance of an interface, to which the executable file EXE is exported by a Component Object Model (COM) server, is created.

FIG. 6 shows an example of the memory structure when an instance of an interface, in which an executable file (EXE) 118 is exported in a Component Object Model (COM) server, is created in the information processing apparatus corresponding to this embodiment.

Usually, when an instance of an interface is created, inside the COM server, requested interfaces 121 and 122 and methods 130 to 135 thereof are created, and they are loaded into memory. Here, a virtual address table is created for each interface 118 and 120, and the virtual address table is passed to the EXE that has requested that they be created. In this virtual address table, the address created with respect to each method 124 to 129 is written. The EXE calls each interface by using these pieces of information. FIG. 6 shows an example in which one EXE creates instances of two interfaces of Interface A and the Interface B and a method inside the interface is used. Methods that are actually used are Method AA, Method AB, Method AC, Method BA, Method BB, and Method BC.

When the code of the EXE calls the function Method AA, first, the address 124 of the Method AA, written inside the virtual address table, is read. At the address 124, the address of the Method AA code 130 created as part of the Interface A of the COM server is written. By calling the address, the code of the EXE can call the Method AA of the Interface A.

Figure 7:
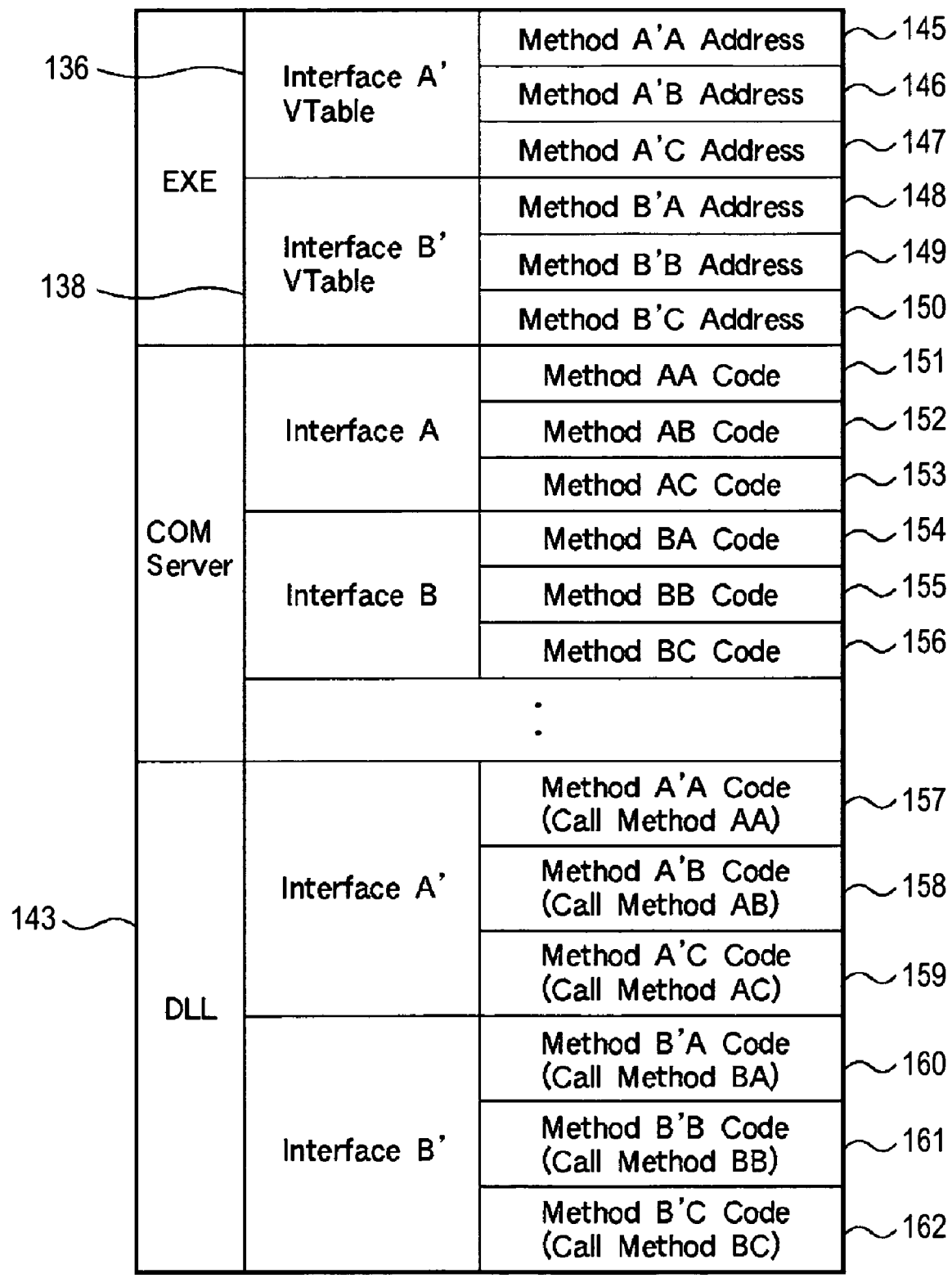
FIG. 7 shows the memory structure of an information processing apparatus.

FIG. 7 shows the memory structure of the information processing apparatus corresponding to this embodiment. FIG. 7 differs from FIG. 6 in that a method calling is relayed using a technique of a Virtual Address Table (VTable) Patch as log obtaining code.

When obtaining a log is begun, DLL 143 for the VTable Patch is loaded into memory. This DLL rewrites the addresses of the methods written inside the virtual address tables 136 and 138 with the addresses of Method A'A 145, Method A'B 146, Method A'C 147, Method B'A 148, Method B'B 149, and Method B° C. 150, which are log obtaining codes inside the DLL. Code of Method A'A 157, Method A'B 158, Method A'C. 159, Method B'A 160, Method B'B 161, and Method B'C 162 inside the DLL 143 record a log and call Method AA 151, and Method AB 152, Method AC 153, Method BA 154, and Method BB 155, Method BC 156 that are loaded into memory so as to receive the original method calling.

Figure 8:
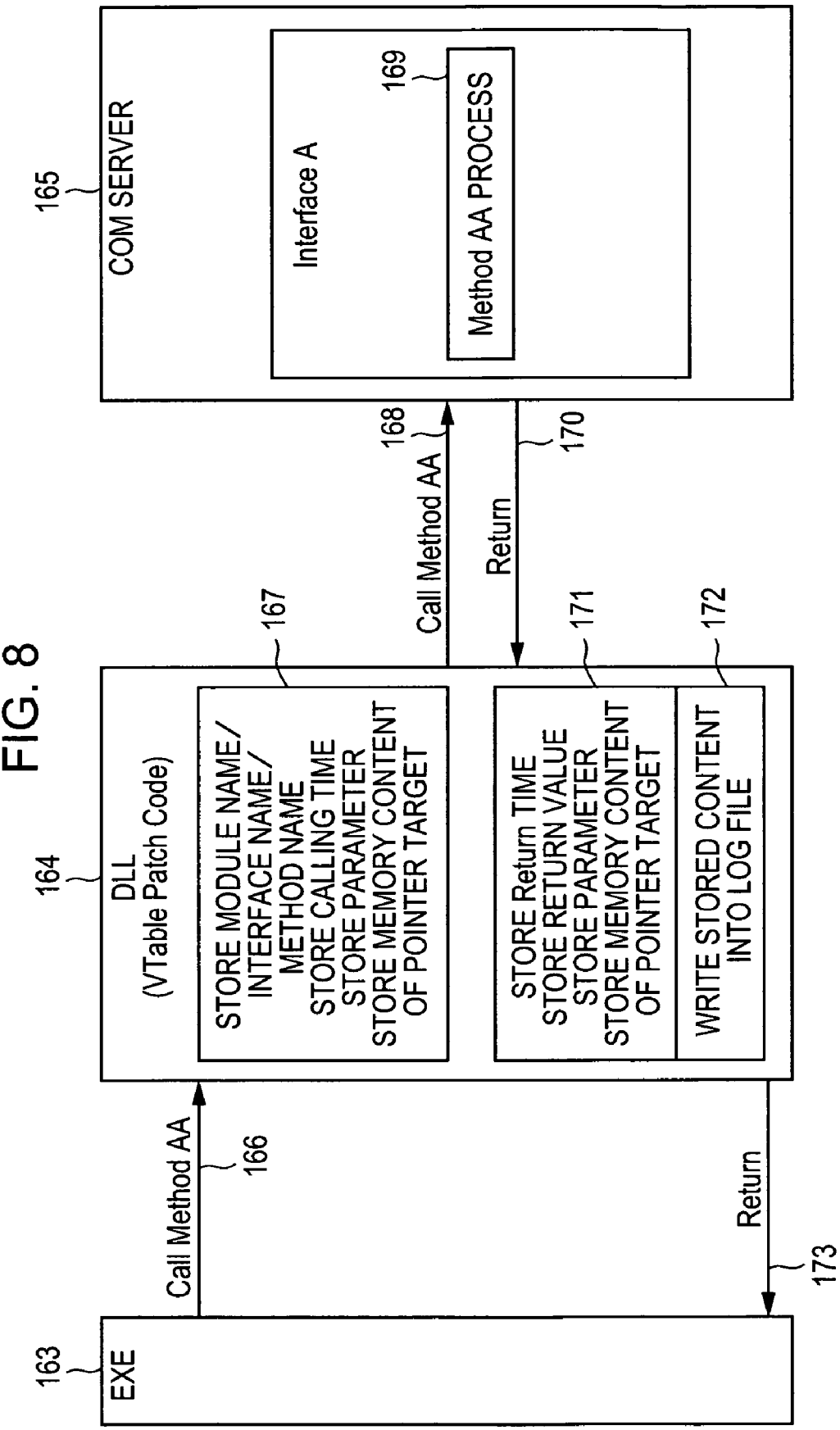
FIG. 8 shows an example of a timing chart when a process for a VTable Patch is performed.

FIG. 8 is a timing chart illustrating the processing of the VTable Patch in FIG. 7. In order to simplify descriptions, FIG. 8 shows an example of how the log obtaining code by the VTable Patch operates when the EXE calls the Method AA of the Interface A inside the COM server. The same processing is performed on the other functions.

When an EXE 163 calls the Method AA 166, the log obtaining code inside the DLL 164 stores the module name, the interface name, and the method name in memory, stores the calling time in memory, stores the parameter at calling time in memory, and stores the memory content indicated by the pointer parameter at calling time in memory 167. Thereafter, the DLL 164 calls the Method AA inside the COM server 165, which should have been originally called 168.

When the Method AA processing 169 of the COM server is completed and control is returned to the DLL 170, the DLL 164 stores the time of return time in memory, stores the return value in memory, and stores the memory content indicated by the pointer parameter at return time in memory 171. Thereafter, the DLL 164 writes the stored log information in a file 172, and control is returned to the EXE as if the Method AA of the COM server is normally terminated 173.

Figure 9:
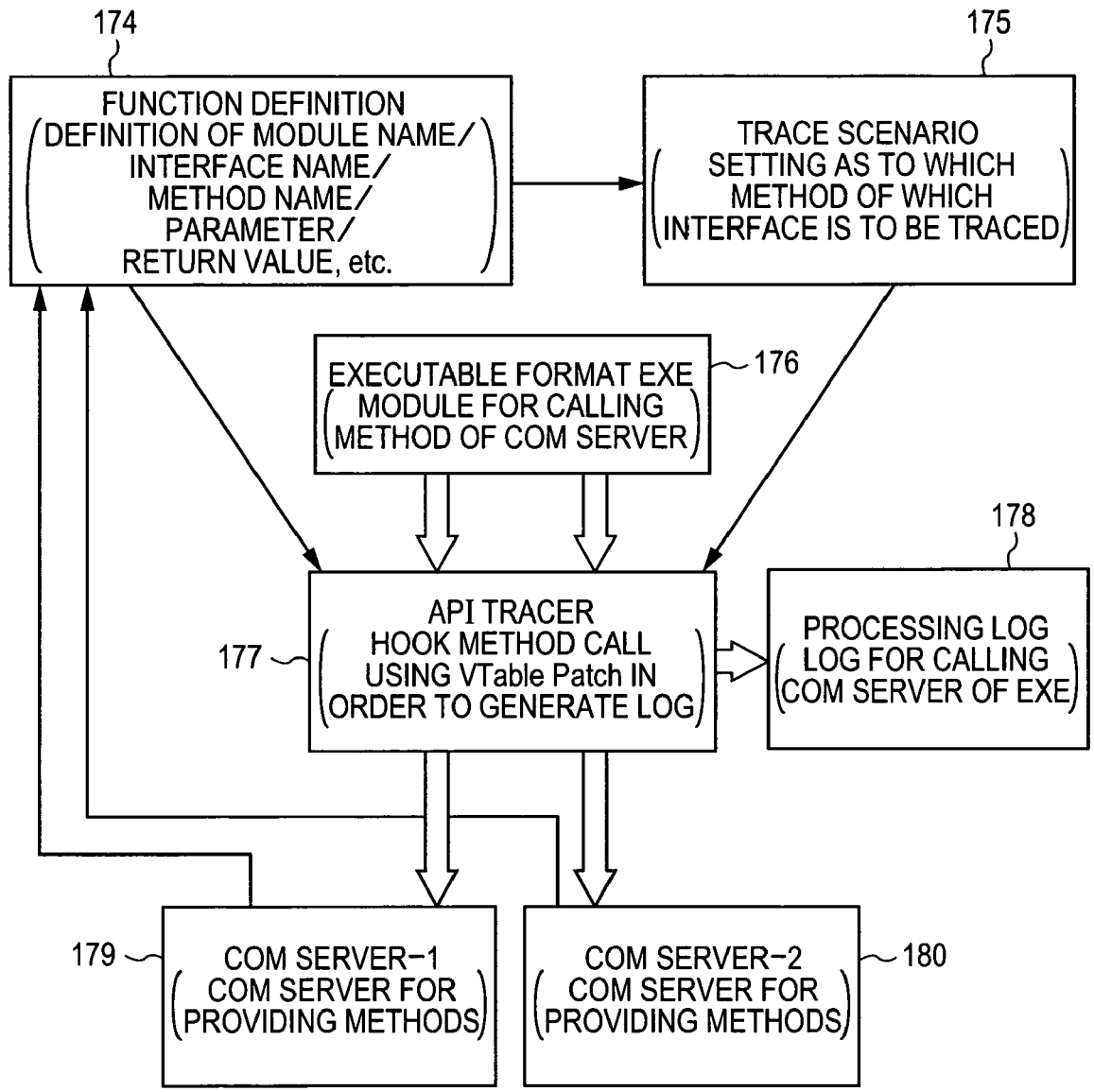
FIG. 9 shows an example of an operation when the executable format file (EXE) is executed.

FIG. 9 shows an example of an operation when the executable format file EXE is executed in the information processing apparatus corresponding to this embodiment. Usually, an EXE 176 in an executable format calls a method inside a COM server-1 179 and a COM server-2 180. Here, a log obtaining code called an API tracer 177 is embedded, and a processing log 178 is created. The API tracer 177 operates on the basis of a file 174 in which the function definition of the COM server-1 179 and the COM server-2 180 is defined and on the basis of a set scenario 175 so that a log is obtained by rewriting the virtual address table of which method of which interface is of which COM server.

FIG. 10 shows an example of a function definition file of the format of functions and methods and the format of return values, which is used in the information processing apparatus corresponding to this embodiment. This function definition file corresponds to the function definition 111 of FIG. 5 and the function definition 174 of FIG. 9.

The exemplary function definition file shown in FIG. 10 includes the DLL name and the function/method name, the parameters and the types of the return values for the function/method. In this embodiment, on the basis of the content indicated by the function definition file, a determination is made as to what kind of parameter/return value each function/method has, and the content is obtained as a log.

As an example, the function definition for the function Func AB inside the A.DLL, shown in FIG. 10, is described below. Func AB includes as arguments, a pointer pBuf which points to the data storage target (write starting address) and dwBufSize which indicates the size of the data. Func AB also indicates the correlation between pBuf and dwBufSize, that is, the correlation such that the size of the data stored in pBuf is indicated by dwBufSize.

FIG. 11 shows an example of a log obtained in the information processing apparatus of the present invention by using the function definition file shown in FIG. 10. The time at which the function/method is called with respect to each calling, and the parameter/return value at that time are generated as a log.

As an example, the log of calling the function Func AB inside the A.DLL, shown in FIG. 11 is described next. When calling Func AB, on the basis of the function definition file shown in FIG. 10, not only the value (0x5034206D) of pBuf as an argument, but also data for the amount of dwBufSize, i.e., for 24 bytes, which exists at the address indicated by that value, are stored as another binary log separately from the normal log. An ID for calling the corresponding Func AB, which is stored inside the binary log file, that is, DataID, is stored in the log as additional information.

FIG. 12 shows an example of the entity of the binary log file stored together with the log shown in FIG. 11. Here, the DataID is stored as a tag for identifying each binary log file, and the main body of the binary data is stored for each DataID.

The function definition file, the log, and the binary log shown in FIGS. 10 to 12 are effective without depending on whether the indication data is input data, output data, or a return value. For example, when the data address is returned as an output parameter from the function and furthermore, a data size is output as a return value from the function, it is also possible to obtain the log of the data main body in a similar manner.

First Embodiment

Figure 13A:
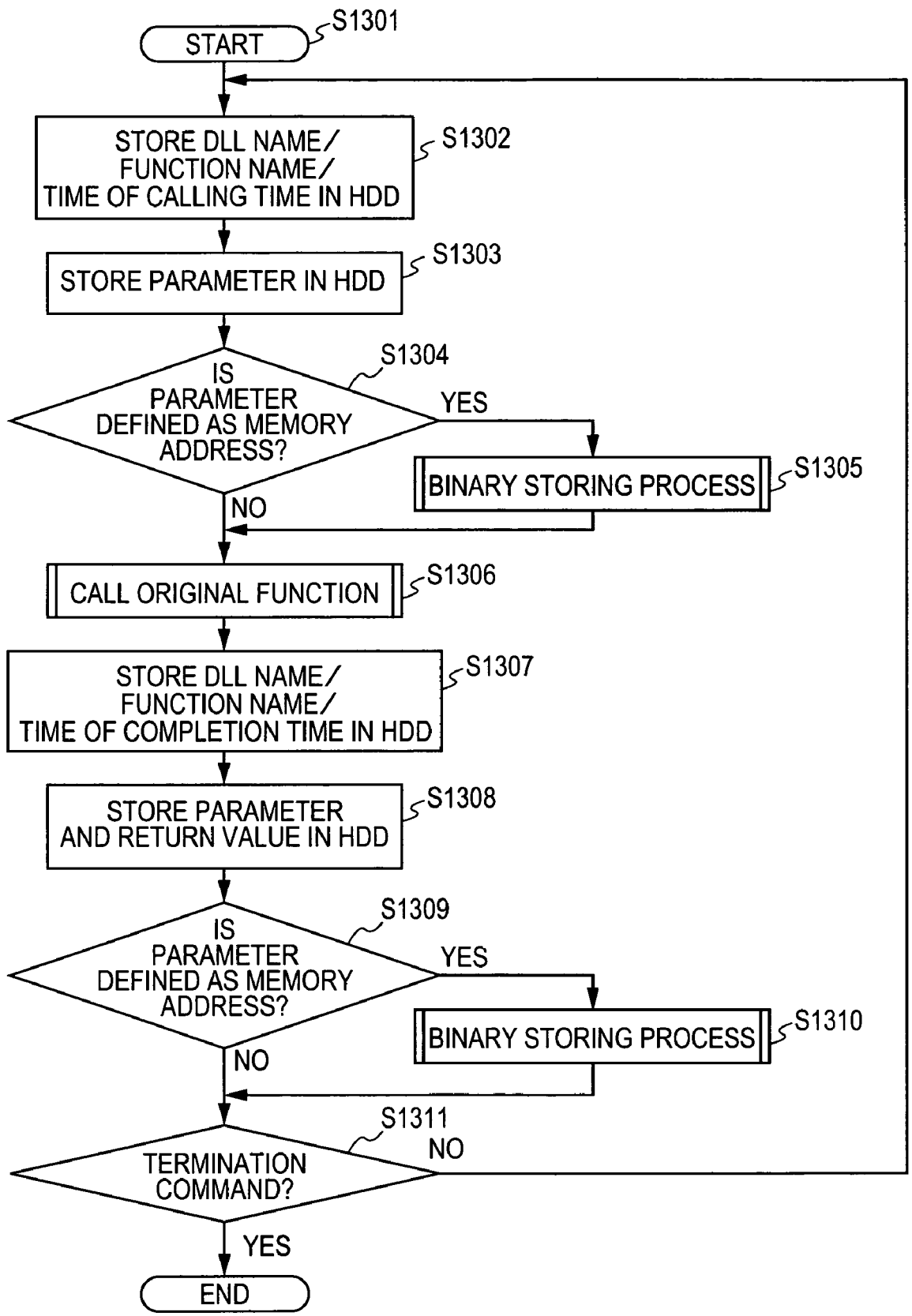
FIGS. 13A and 13B are flowcharts of examples of processing corresponding to a first embodiment of the present invention.
Figure 13B:
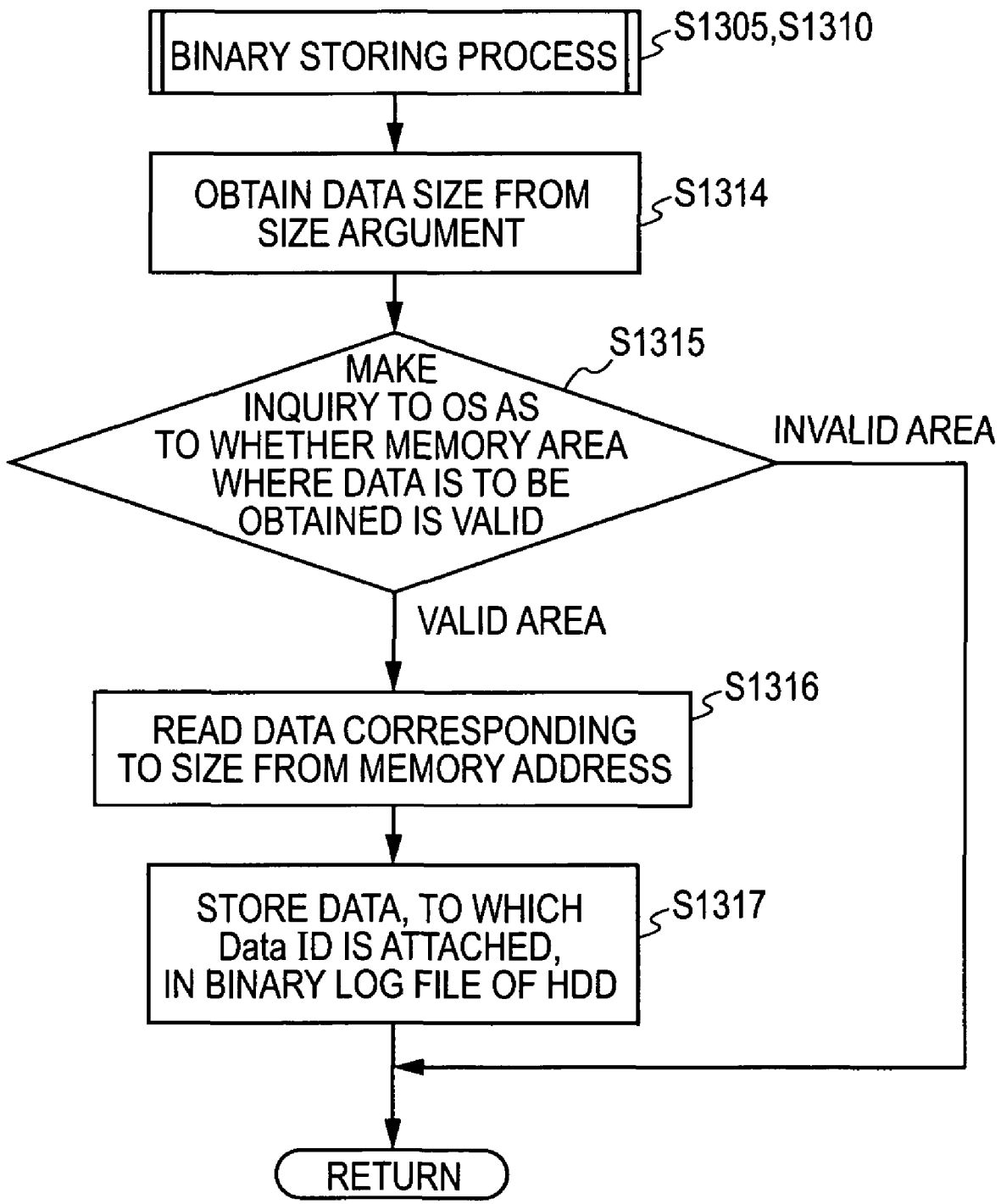

A description is given of processing performed in the information processing apparatus of the present invention on the basis of the above configuration. FIGS. 13A and 13B are flowcharts corresponding to examples of processing related to the storage of a binary log in this embodiment.

In FIG. 13A, when processing is started as a result of the set function/method being called (S1301), the DLL name, the function name, and the calling time are stored in an HDD (S1302), and the parameter for the calling is stored in the HDD (S1303). Next, it is determined whether or not the parameter is defined as a memory address on the basis of the function definition file shown in FIG. 11 (S1304), and a binary storing process is performed (S1305) when it is determined that the parameter is defined as a memory address.

The details of the binary storing process (S1305) are as shown in FIG. 13B and described next. The data size is obtained from the argument indicating the size of the function definition (S1314). The memory area corresponding to the amount of data size is computed from the memory address (write starting address) indicated by the pointer pBuf, and then an inquiry is made to the operating system (OS) as to whether the computed memory area is a valid area (S1315). Only when the computed memory area is determined to be a valid area, data corresponding to the amount of size is read from the memory (S1316), and the data, to which the DataID is attached, is stored in the binary log file of the HDD (S1317). The binary storing process (FIG. 13B) is then ended and processing returns to FIG. 13A. On the other hand, when the computed memory area is determined to be not a valid area (S1315), the binary storing process is directly terminated, and storage as a binary log file for the corresponding data is not performed. When the parameter is not defined as a memory address, the data storing process is not performed. The binary storing process (FIG. 13B) is then ended and processing returns to FIG. 13A.

Referring back to FIG. 13A, the original function is then called (S1306). When the processing inside the function is completed (S1306), the DLL name, the function name, and the time of termination time are stored in the HDD (S1307) and the parameter and the return value are stored in the HDD (S1308). Next, it is determined whether or not a parameter is defined as a memory address on the basis of the function definition file shown in FIG. 11 (S1309). When the parameter is defined, a binary storing process (S1310) is performed. The binary storing process is identical to the above-described processing shown in FIG. 13B. Processing for an abnormality is continued until the program for which an evaluation is made is completed (S1311).

As has thus been described, according to this embodiment, an inquiry is made in advance as to whether or not the data writing area is a valid area on the basis of the memory address at which data is to be written and the data size. After the data writing area is determined to be a valid area, writing is performed. As a result, it does not occur that data is erroneously written into an invalid area, thus preventing exception processing that should occur when data is written into an invalid area from occurring.

Second Embodiment

In the above-described first embodiment, unless the entire binary area where storage is performed is a valid area, the process for storing the binary data is not performed at all. However, in this embodiment, even if some portions of the binary area are invalid, the binary data up to that immediately before an invalid memory address exists can be stored.

Figure 14A:
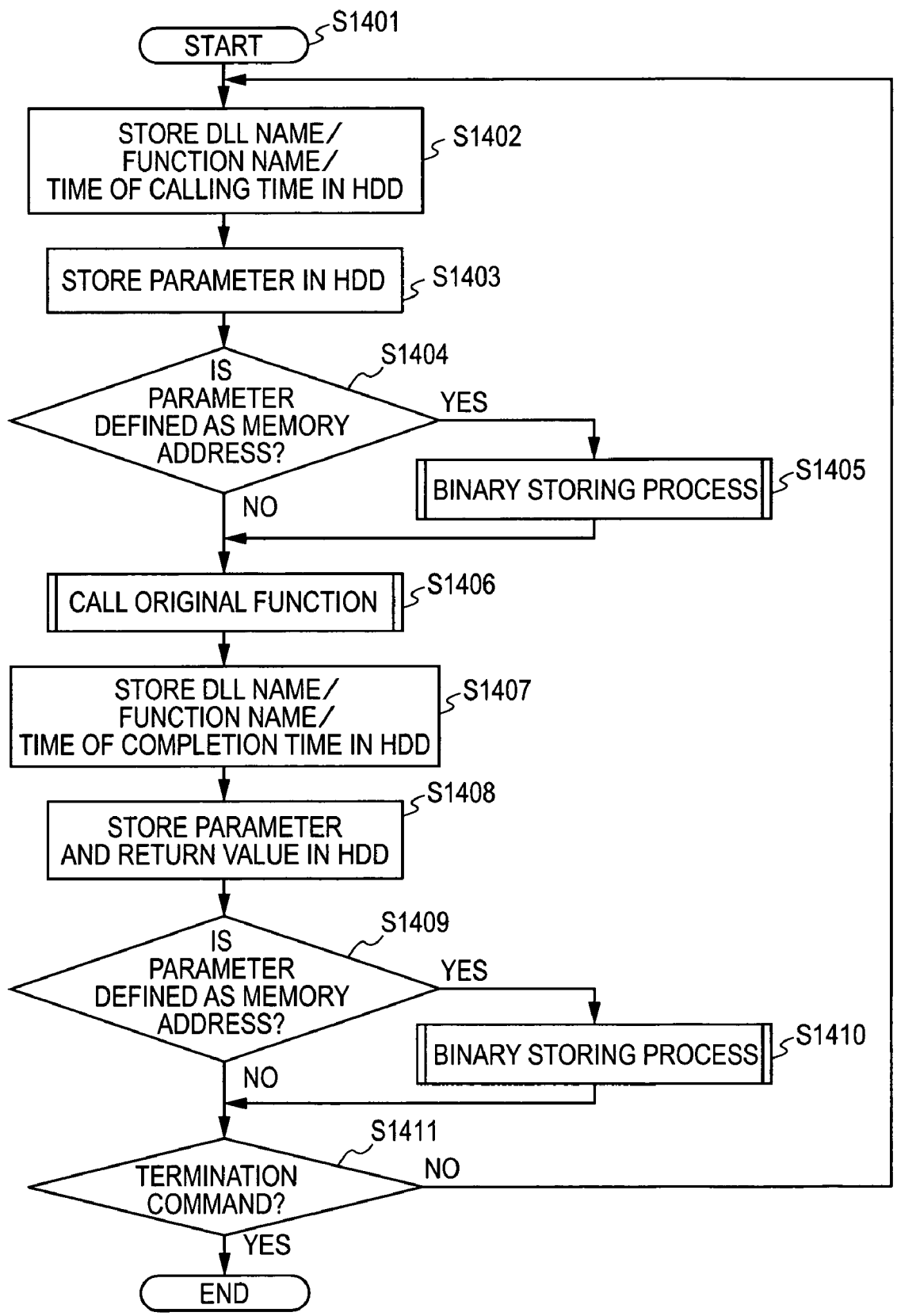
FIGS. 14A and 14B are flowcharts of examples of processing corresponding to a second embodiment of the present invention.
Figure 14B:
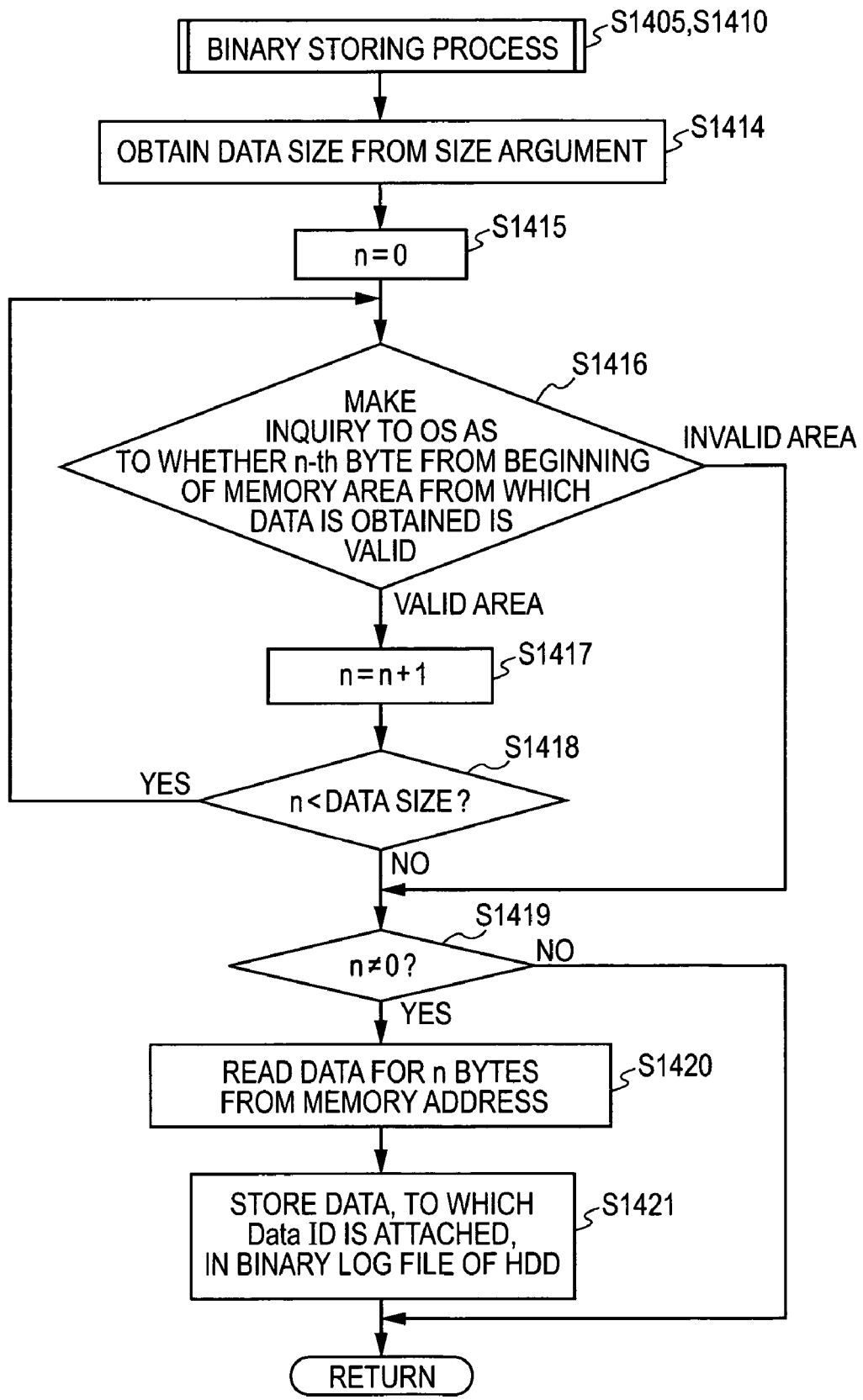

A description is given below of processing performed in the information processing apparatus of the present invention. FIGS. 14A and 14B are flowcharts corresponding to an example of processing related to the storage of a binary log in this embodiment.

In FIG. 14A, when processing is started as a result of a set function/method being called (S1401), the DLL name, the function name, and the time of calling time are stored in an HDD (S1402), and the parameter for the calling is stored in the HDD (S1403). Next, it is determined whether or not the parameter is defined as a memory address on the basis of the function definition file shown in FIG. 11 (S1404). When it is determined that the parameter is defined as a memory address, a binary storing process (S1405) is performed.

The details of the binary storing process are as shown in FIG. 14B and are described next. The data size is obtained from the argument indicating the size of the function definition (S1414). In loop processing (S1416 to S1418) corresponding to the amount of the data size, the data area is written in a valid area in one-byte units. An inquiry is made to the OS as to whether or not the memory area for one byte at the n-th byte from the beginning of the memory address at which the data is obtained is a valid area (S1416). When the memory area is determined to be a valid area, n is incremented to make a determination of the next data area (S1417) and processing proceeds to S1418. When the memory area is determined to be an invalid area, the determination of the data area is terminated at that point in time and processing proceeds to S1419. In S1418, it is determined whether n is smaller than the data size. When it is determined that the n is smaller than the data size, processing returns to S1416. When it is determined that the n is not smaller than the data size, processing proceeds to S1419.

When the loop processing from S1416 to S1418 is completed, the number of bytes of the valid area becomes n. Next, a determination is made as to whether or not there is a valid area according to whether or not n is 0 (S1419). When the memory area is determined that there is a valid area (n≠0), n-byte data, which corresponds to the amount of the size, is read from the beginning of the memory area (S1420). The data, to which DataID is attached, is stored in the binary log file of the HDD (S1421). The binary storing process (FIG. 14B) then ends and processing returns to FIG. 14A. On the other hand, when n=0 and it is determined that the entire area is erroneous, the data is not stored, and the binary storing process ends and processing returns to FIG. 14A. When the parameter is not defined as a memory address, the data storing process is not performed.

Referring to FIG. 14A, the original function is then called (S1406). When the processing inside the function is completed (S1406), the DLL name, the function name, and the time of termination time are stored in an HDD (S1407) and the parameters and the return values for the calling are stored in the HDD (S1408). Next, it is determined whether or not the parameter is defined as a memory address on the basis of the function definition file shown in FIG. 11 (S1409). When it is determined that the parameter is defined as a memory address, a binary storing process is performed. The binary storing process is identical to the above-described processing in FIG. 14B. The above processing is continued until the program for which an evaluation is made is completed (S1411).

According to the foregoing, even if some portions of the binary area are invalid, the binary data up to that immediately before an invalid memory address exists can be stored.

Other Embodiments

The present invention may be applied to a system composed of a plurality of devices (for example, a host computer, an interface device, a reader, and a printer) and may further be applied to an apparatus composed of one device (for example, a copier or a facsimile).

The present invention can be achieved by supplying a storage medium (or a recording medium) storing software program code that achieves the functions of the above-described embodiments to a system or an apparatus. That is, the present invention can be achieved by enabling a computer (or a CPU or a micro-processing unit (MPU)) of the system or apparatus to read and to execute the program code stored in the storage medium. In this case, the program code itself read out of the storage medium realizes the functions of the above-described embodiments and the storage medium storing the program code can realize the present invention. Also, in addition to the functions of the above-described embodiments being realized by the computer by executing the read-out program code, the functions of the above-described embodiments may be realized by the OS running on the computer performing part or all of the actual processing based on instructions of the program code.

Moreover, the functions described above may be realized in such a way that the program code read out from the storage medium is written to memory provided to a function expansion board inserted to the computer or a function expansion unit connected to the computer and thereafter, the CPU provided in the function expansion board or in the function expansion unit performs part or all of the actual processing based on instructions of the program code.

Although the present invention has been described with reference to exemplary embodiments with a certain degree of particularity, many apparently widely different embodiments of the invention can be made without departing from the spirit and the scope thereof. It is to be understood that the invention is not limited to the specific embodiments thereof except as defined in the appended claims.

This application claims the benefit of Japanese Application No. 2004-364783 filed Dec. 16, 2004, which is hereby incorporated by reference herein in its entirety.

What is claimed is:

1. An information processing apparatus for relaying a calling from a first module to a function inside a second module in software divided into a plurality of modules, the information processing apparatus comprising:

at least one storage device having a plurality of storage areas;

a log obtaining unit configured to relay the calling from the first module to the function inside the second module and obtain a log in the second module corresponding to the calling, the log including at least a write starting address of binary data and a data size thereof;

an area deciding unit configured to decide a memory area in the at least one storage device where the binary data is written based on the write starting address and the data size;

a determination unit configured to sequentially determine whether each byte of the memory area falls within an invalid area to which access is prohibited until a byte is encountered which falls within the invalid area; and a write control unit configured to write into a log file the binary data from the write starting address to a byte immediately before the byte which is encountered to fall within the invalid area in the memory area.

2. The information processing apparatus according to claim 1, wherein the determination unit is configured to determine whether each byte of the memory area falls within the invalid area by making an inquiry to an operating system.

3. An information processing method, for an information processing apparatus including at least one storage device having a plurality of storage areas, for relaying a calling from a first module to a function inside a second module in software divided into a plurality of modules, the information processing method comprising:

an obtaining step of relaying the calling from the first module to the function inside the second module and obtaining a log in the second module corresponding to the calling, the log including at least a write starting address of binary data and a data size thereof;

a deciding step of deciding a memory area in the at least one storage device where the binary data is written based on the write starting address and the data size;

a determining step of sequentially determining whether each byte of the memory area falls within an invalid area to which access is prohibited until a byte is encountered which falls within the invalid area; and a write control step of writing into a log file the binary data from the write starting address to a byte immediately before the byte which is encountered to fall within the invalid area in the memory area.

4. The information processing method according to claim 3, wherein, in the determining step, determining whether each byte of the memory area falls within the invalid area is determined by making an inquiry to an operating system.

5. A computer-readable storage medium having stored thereon a computer program for controlling a an information processing apparatus including at least one storage device having a plurality of storage areas, for relaying a calling from a first module to a function inside a second module in software divided into a plurality of modules to perform an information processing method, the information processing method comprising:

an obtaining step of relaying the calling from the first module to the function inside the second module and obtaining a log in the second module corresponding to the calling, the log including at least a write starting address of binary data and a data size thereof;

a deciding step of deciding a memory area in the at least one storage device where the binary data is written based on the write starting address and the data size;

a determining step of sequentially determining whether each byte of the memory area falls within an invalid area to which access is prohibited until a byte is encountered which falls within the invalid area; and a write control step of writing into a log file the binary data from the write starting address to a byte immediately before the byte which is encountered to fall within the invalid area in the memory area.

* * * * *